United States Patent
Oyama et al.

(10) Patent No.: US 10,933,332 B2
(45) Date of Patent: Mar. 2, 2021

(54) INFORMATION PROCESSING SYSTEM

(71) Applicant: Universal Entertainment Corporation, Tokyo (JP)

(72) Inventors: Masaki Oyama, Tokyo (JP); Atsushi Kumita, Tokyo (JP); Toshikazu Jinnouchi, Tokyo (JP)

(73) Assignee: Universal Entertainment Corporation, Tokyo (JP)

(*) Notice: Subject to any disclaimer, the term of this patent is extended or adjusted under 35 U.S.C. 154(b) by 0 days.

(21) Appl. No.: 16/141,075

(22) Filed: Sep. 25, 2018

(65) Prior Publication Data

US 2019/0091580 A1    Mar. 28, 2019

(30) Foreign Application Priority Data

Sep. 28, 2017  (JP) .............................. JP2017-187767

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *A63F 13/792* | (2014.01) |
| *G06F 3/0482* | (2013.01) |
| *G06F 3/0481* | (2013.01) |
| *H04L 12/14* | (2006.01) |
| *H04M 15/00* | (2006.01) |
| *G07F 17/32* | (2006.01) |
| *H04W 4/24* | (2018.01) |
| *A63F 13/87* | (2014.01) |
| *A63F 13/795* | (2014.01) |
| *H04W 4/12* | (2009.01) |

(Continued)

(52) U.S. Cl.
CPC .......... *A63F 13/792* (2014.09); *G06F 3/0482* (2013.01); *G06F 3/04817* (2013.01); *G07F 17/323* (2013.01); *G07F 17/3227* (2013.01); *G07F 17/3232* (2013.01); *H04L 12/14* (2013.01); *H04M 15/00* (2013.01); *H04M 15/8083* (2013.01); *H04M 15/8221* (2013.01); *H04W 4/24* (2013.01); *A63F 13/795* (2014.09); *A63F 13/87* (2014.09); *A63F 2300/5513* (2013.01); *H04L 51/043* (2013.01); *H04L 67/38* (2013.01); *H04W 4/12* (2013.01)

(58) Field of Classification Search
USPC .................... 463/1, 5, 20, 22, 29, 30, 39, 42
See application file for complete search history.

(56) References Cited

U.S. PATENT DOCUMENTS

| | | | | |
|---|---|---|---|---|
| 8,645,238 B1* | 2/2014 | Gailloux | ................ | G06Q 30/04 |
| | | | | 455/405 |
| 2002/0161712 A1* | 10/2002 | Hatano | ................. | G06Q 30/06 |
| | | | | 705/52 |
| 2009/0156170 A1* | 6/2009 | Rossano | ................. | H04L 51/38 |
| | | | | 455/412.1 |

\* cited by examiner

*Primary Examiner* — Adetokunbo O Torimiro
(74) *Attorney, Agent, or Firm* — Simpson & Simpson, PLLC; S. Peter Konzel (57) ABSTRACT

An information processor comprises a terminal-side controller programmed to execute: (A1) a process of allowing a creation of a message to the information processor of a transmission destination; and (A2) a process of expanding a representable range of the message on condition of charging when the message is created, and a server comprises a server-side controller that calculates a charge amount charged for the message in the information processor by referring to a charge amount determination data, and a server-side memory that stores the charge amount correspondingly to each of the information processors.

12 Claims, 10 Drawing Sheets

(51) Int. Cl.
*H04L 29/06* (2006.01)
*H04L 12/58* (2006.01)

INFORMATION PROCESSING SYSTEM

CROSS-REFERENCE TO RELATED APPLICATIONS

This application is Entitled to the benefit of Japanese Pat. App. No. 2017-187767, filed on Sep. 28, 2017.

BACKGROUND OF THE INVENTION

1. Field of Invention

The present invention relates to an information processing system.

2. Description of Related Art

For example, Japanese Unexamined Patent Application Publication No. 2002-263372 discloses a system in which a plurality of Internet terminals and gaming machines are communicably connected via a game server. Specifically, a system is disclosed in which the game server receives and stores a diagnosis result and a posted mail from the gaming machine that executes the diagnosis based on an individual input information, and as for the diagnosis result, it is displayed on the network terminal via a network line, and on the other hand, as for the posted mail, it is displayed on the network terminal as a condition of charging.

However, in the above-described conventional system, in order to charge only when reading the message of the mail stored in the game server, for example, when a large amount of mail of a long text message is left without being read in a state of being accumulated, there is a problem that the operation cost is increased by transmitting and receiving messages.

SUMMARY OF THE INVENTION

It is an object of the present invention to provide an information processing system capable of preventing an increase in the operation cost due to transmission and reception of messages.

The present invention is an information processing system including a plurality of information processors on which games are executed and a server communicably connected to the plurality of information processors, and wherein the information processor comprises a terminal-side controller programmed to execute: (A1) a process of allowing a creation of a message to the information processor of a transmission destination; and (A2) a process of expanding a representable range of the message under a condition of charging when the message is created,
the server comprises: a server-side controller that calculates a charge amount charged for the message in the information processor by referring to a charge amount determination data, and a server-side memory that stores the charge amount correspondingly to each of the information processors.

According to the configuration mentioned above, when a user freely creates a message by expanding the representable range of the message, the charging is performed, whereby it is possible to prevent the increase in the operation cost due to the transmission and reception of the message.

In the present invention, the terminal-side controller of each of the information processors may expand the representable range of the message by increasing the number of characters of the message in the process (A2), and the server-side controller of the server may calculate the charge amount corresponding to the number of characters of the message by referring to the charge amount determination data.

According to the configuration mentioned above, the degree of freedom in creating a message is increased due to an increase in the number of characters, thereby it is possible to increase the possibility of obtaining a charge.

In the present invention, the terminal-side controller of each of the information processors may expand the representable range of the message by increasing the number of representations of the message in the process (A2), and the server-side controller of the server may calculate the charge amount corresponding to the number of representations of the message by referring to the charge amount determination data.

According to the configuration mentioned above, the degree of freedom in creating a message is increased due to an increase in the number of representations, thereby it is possible to increase the possibility of obtaining a charge.

In the present invention, the server-side memory of the server may store a status information of a status that increases correspondingly to a degree of progress in the game with respect to each of the plurality of information processors,
the terminal-side controller of each of the information processors,
in the process (A1), when allowing the creation of the message, acquiring the status information of a transmission source of the message and the status information of a transmission destination of the message from the server, and setting the representable range of the message on the basis of the status information,
in the process (A2), when the message is created, expanding the representable range of the message on condition of charging.

According to the configuration mentioned above, the user's interest for the game can be enhanced by changing the representable range of the message correspondingly to the degree of progress of the game in the information processor.

In the present invention, the server-side memory of the server may store a present information indicating content of present given among the plurality of information processors, the terminal-side controller of each of the information processors,
in the process (A1), when allowing the creation of the message, acquiring the present information from the server, and setting the representable range of the message on the basis of the present information, in the process (A2), when the message is created, expanding the representable range of the message on condition of charging.

According to the configuration mentioned above, the user's interest for the game can be enhanced by changing the representable range of the message correspondingly to the content of the present given among the information processors.

DESCRIPTION OF THE PREFERRED EMBODIMENTS

The information processing system of the present invention will be described based on the drawings.

(Information Processing System)

Figure 1:
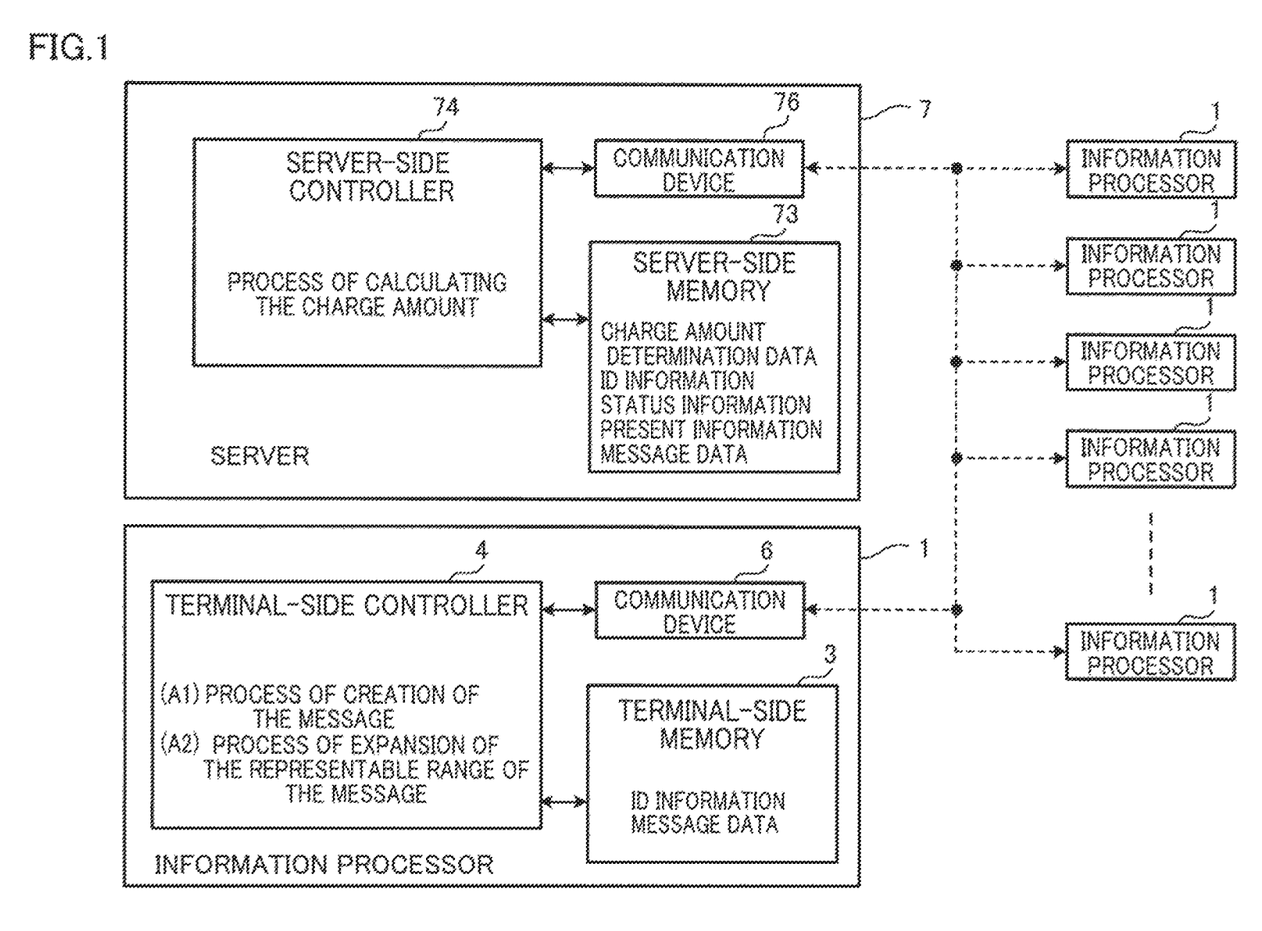
FIG. 1 is an illustrative view showing an schematic configuration of an information processing system.

As shown in FIG. 1, the information processing system including a plurality of information processors 1 on which games are executed and a server 7 communicably connected to the plurality of information processors 1. The information processor 1 includes a memory 3 that stores an ID information and a message data, a terminal-side controller 4, and a communication device 6 that can perform a data communication with the server 7. The terminal-side controller 4 is programmed to execute: (A1) a process of allowing a creation of a message to the information processor of a transmission destination; and (A2) a process of expanding a representable range of the message under a condition of charging when the message is created.

The server 7 has a server-side memory 73, a server-side controller 74, and a communication device 76. The server-side memory 73 stores a charge amount determination data, an ID information, a status information, a present information, a message data, or the like, and for example, the server-side memory 73 stores the charge amount in a storage area of a charge amount data table correspondingly to each of the information processors 1. The communication device 76 is connected to the information processor 1 so as to enable a data communication. The server-side controller 74 calculates the charge amount charged for the message in the information processor 1 by referring to the charge amount determination data, and stores the calculated charge amount in the charge amount data table correspondingly to the ID information.

According to the configuration mentioned above, when a user freely creates a message by expanding the representable range of the message, the charging is performed, whereby it is possible to prevent the increase in the operation cost due to the transmission and reception of the message.

Here, the "charging" may be a request by currency such as an actual yen or dollar, or may be a request by a coin, a gem, or an item used in the game. In addition, the coin, gem and item can be purchased at shops in the game. The "representable range of a message" is the type and size capable of representing a message. As the types that can be represented, there are a character representation using characters, a graphic representation using graphics such as characters and icons, and still images, a voice representation such as users' voice, animals' voice, and music, a video representation of users and characters, and the like. As the sizes that can represent a message, there are a size of the number of characters such as 100 characters and 200 characters, a reproduction (record) time and sound quality of a sound, a reproduction time (record) time and image quality of a video, and the like.

The "charge amount determination data" is data for determining the charging according to the type and size of the expanded message when the "representable range of a message" is expanded. The "ID information" is information for identifying each of the information processors 1. The "status information" is information indicating a status that increases correspondingly to the degree of progress of a game. The "degree of progress of a game" is exemplified by the level, rank, play time, and degree of paying of each of the players in the game. For example, when the player performs a game with a large payment amount for a long period of time, a high status corresponding to the play time and the payment amount is given.

In addition, the server 7 and the information processor 1 may be portable or stationary. Examples of the portable server 7 and information processor 1 include portable information devices such as a portable computer, a laptop computer, a notebook computer, a tablet personal computer, a handheld personal computer, a PDA (Personal Data Assistant), and a smart phone. As the stationary server 7 and information processor 1, a desktop personal computer and a gaming machine are exemplified.

The terminal-side memory 3 of the information processor 1 and the server-side memory 73 of the server 7 store various kinds of data as described above and also store programs executed by the controllers 4 and 74. The data and programs stored in the memories 3 and 73 may be stored in advance at the factory shipment stage or may be downloaded and stored. The communication means may be a bidirectional communication path such as the Internet or a cable television, or may be a broadcast that transmits information only in one direction.

In addition, the data and program stored in the memories 3 and 73 may be stored in a recording medium such as a floppy disk, a CD-ROM, a DVD-ROM, an MO (magneto-optical disk), a flash memory or the like, and read out from the recording medium as necessary and then installed in the memory.

The information processing system may be configured to expand the representable range of the message by increasing the number of characters of the message. That is, the terminal-side controller 4 of the information processor 1 may expand the representable range of the message by increasing the number of characters of the message in the process (A2), and the server-side controller 74 of the server 7 may calculate the charge amount corresponding to the number of characters of the message by referring to the charge amount determination data. According to the configuration mentioned above, the degree of freedom in creating a message is increased due to an increase in the number of characters, thereby it is possible to increase the possibility of obtaining a charge.

In addition, the information processing system may be configured to expand the representable range of the message by increasing the number of representations of the message. That is, the terminal-side controller 4 of the information processor 1 may expand the representable range of the message by increasing the number of representations of the message in the process (A2), and the server-side controller 74 of the server 7 may calculate the charge amount corresponding to the number of representations of the message by referring to the charge amount determination data. As "increasing the number of representations", it means that the type of representation such as a graphic representation, a sound representation, a video representation and the like is increased in addition to the character representation, which was a character representation structure expressing a message by characters. According to the configuration mentioned above, the degree of freedom in creating a message is increased due to an increase in the number of representations, thereby it is possible to increase the possibility of obtaining a charge.

In addition, the information processing system may be configured to set the representable range of the message based on the status information. That is, the server-side memory 73 of the server 7 stores the status information indicating a status that increases correspondingly to the degree of progress of the game with respect to each of the plurality of information processors 1, and the terminal-side controller 4 of the information processor 1 may, in the process (A1), when allowing the creation of the message, acquire the status information of the transmission source of the message and the status information of the transmission destination of the message from the server 7 and set the representable range of the message based on the status information, and in the process (A2), when the message is created, expand the representable range of the message under the condition of charging. According to the configuration mentioned above, the user's interest for the game can be enhanced by changing the representable range of the message correspondingly to the degree of progress of the game in the information processor.

In addition, the information processing system may be configured to change the representable range of the message correspondingly to the content of the present. That is, the server-side memory 73 of the server 7 stores the present information indicating the content of the present given among the plurality of information processors 1, and the terminal-side controller 4 of the information processor 1 may, in the process (A1), when allowing the creation of the message, acquire the present information from the server 7 and set the representable range of the message based on the present information, and in the process (A2), when the message is created, expand the representable range of the message under the condition of charging. According to the configuration mentioned above, the user's interest for the game can be enhanced by changing the representable range of the message correspondingly to the content of the present given among the information processors 1.

In addition, the present information may determine the content of the present on the basis of the status information in the information processor 1 of the transmission destination as the destination of the present. The present information is acquired from the server 7 with a predetermined action in the information processor 1 of the reception source as a trigger. The "predetermined action in the information processor 1" is, for example, an action in which the information processor 1 logs in to the server 7, an action to clear a mission such as a mini game provided in a game, an action to start a game, an action to end a game, an action in which a player who is a user of the information processor 1 inquires of the server 7 for the presence or absence of the present information, an action to inquire for the presence or absence of the present information by a timer in the information processor 1 regularly or irregularly, and the like. In a case that the "predetermined action" is logging in to the server 7, it is possible to increase the frequency of participating in the game by increasing the number of logins to the server for acquiring the present information.

(Information Processor 1)

Figure 2:
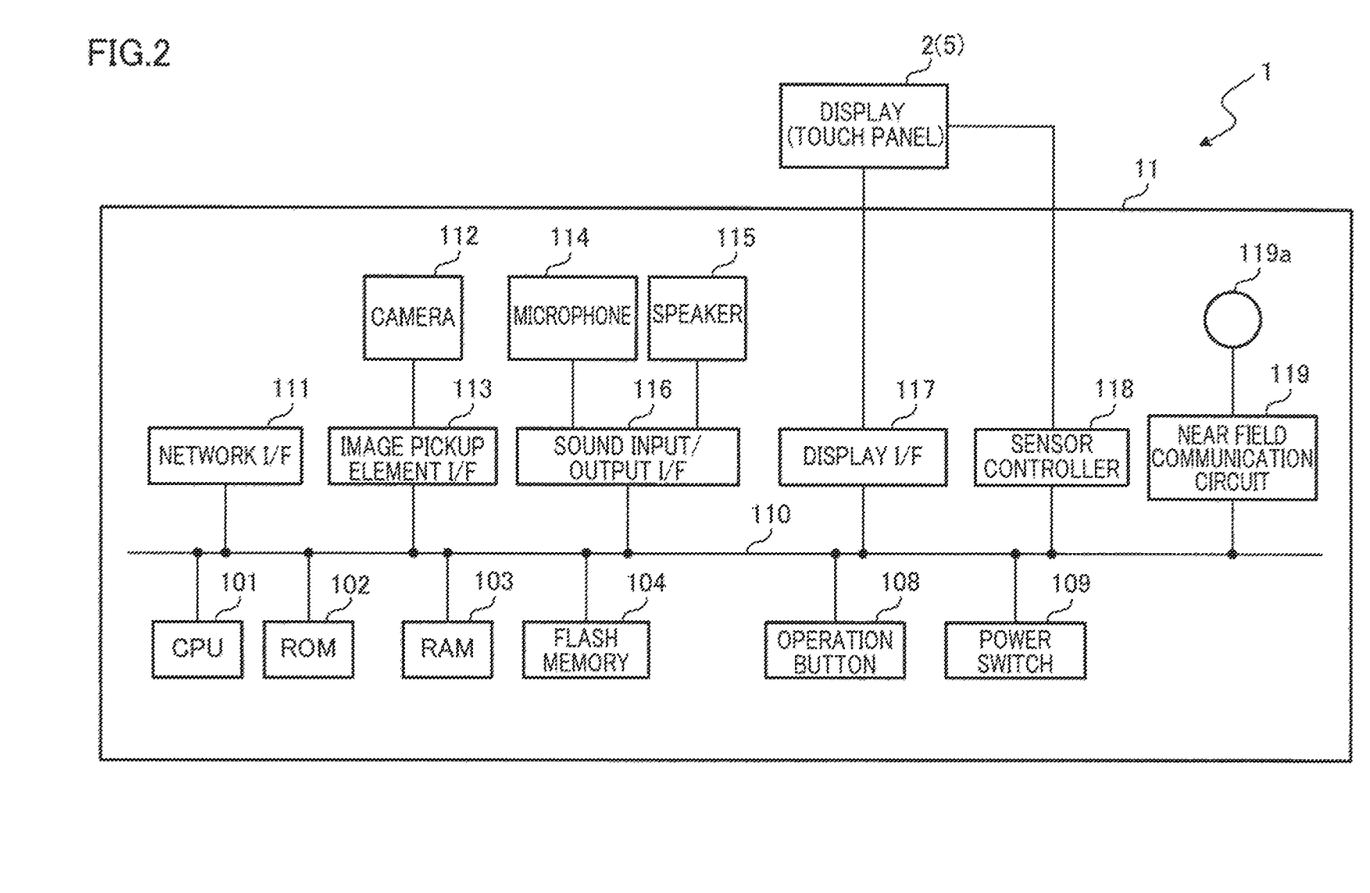
FIG. 2 is a block diagram showing an electric configuration of an information processor.

As shown in FIG. 2, an example of the information processor 1 connected to the server 7 will be specifically described. In addition, in the following description, a configuration is described in which a slot game for obtaining a game result based on the symbols when the symbols of the video reel are variably displayed and stopped is executed, but the present invention is not limited thereto.

The information processor 1 displays an ID image for identifying each of the plurality of information processors 1 set as the same group in the game screen and is connected with the server 7 that causes a logged-in information processor 1 to run a game among the plurality of information processors 1, which comprises a display 2 for displaying an image, a touch panel 5 provided on the entire surface of the display 2 for receiving an input from the player, a communication device enabling a data communication with the server 7, and a memory.

(Information Processor 1: Electric Configuration)

More specifically, the information processor 1 includes a CPU 101, a ROM 102, a RAM 103, a flash memory 104, an operation button 108, a power switch 109, a bus line 110, a network I/F 111, a camera 112, an image pickup element I/F 113, a microphone 114, A speaker 115, a sound input/output I/F 116, a display I/F 117, a sensor controller 118, a short-range communication circuit 119, and an antenna 119a of the short-range communication circuit 119 are provided in a cabinet 11.

The CPU (Central Processing Unit) 101 controls the overall operation of the information processor 1. The ROM (Read Only Memory) 102 stores a program used for driving the CPU 101, such as an IPL (Initial Program Loader).

A RAM (Random Access Memory) 103 is used as a work area of the CPU 101. The flash memory 104 stores various data such as a game program, a communication program, image data, and voice data. The operation button 108 is a button that is operated when the information processor 1 is initially set. The power switch 109 is a switch for switching ON/OFF of the power of the information processor 1.

The network I/F (Interface) 111 is interface for performing a data communication by utilizing a communication network such as the Internet. The information processor 1 is connected to the server 7 in FIG. 1 via the network I/F 111 so as to enable a data communication. The camera 112 is a kind of built-in type image pickup unit that captures an image of a subject under the control of the CPU 101 to obtain image data. The image pickup element I/F 113 is a circuit that controls driving of the camera 112. The microphone 114 is a kind of built-in type sound collecting unit for inputting a sound. The sound input/output I/F 116 is a circuit for processing input and output of sound signals between the microphone 114 and the speaker 115 under the control of the CPU 101. The display I/F 117 is a circuit that transmits image data to the display 2 under the control of the CPU 101. The display 2 is provided on the front surface of the cabinet 11. The sensor controller 118 is a circuit that receives an input from the touch panel 5 provided on the display 2. The short-range communication circuit 119 is a communication circuit such as an NFC (Near Field Communication) (registered trademark), a Bluetooth (registered trademark), or the like. The bus line 110 is an address bus, a data bus, or the like for electrically connecting each component such as the CPU 101.

(Information Processor 1: Process Selection Function)

Figure 3:
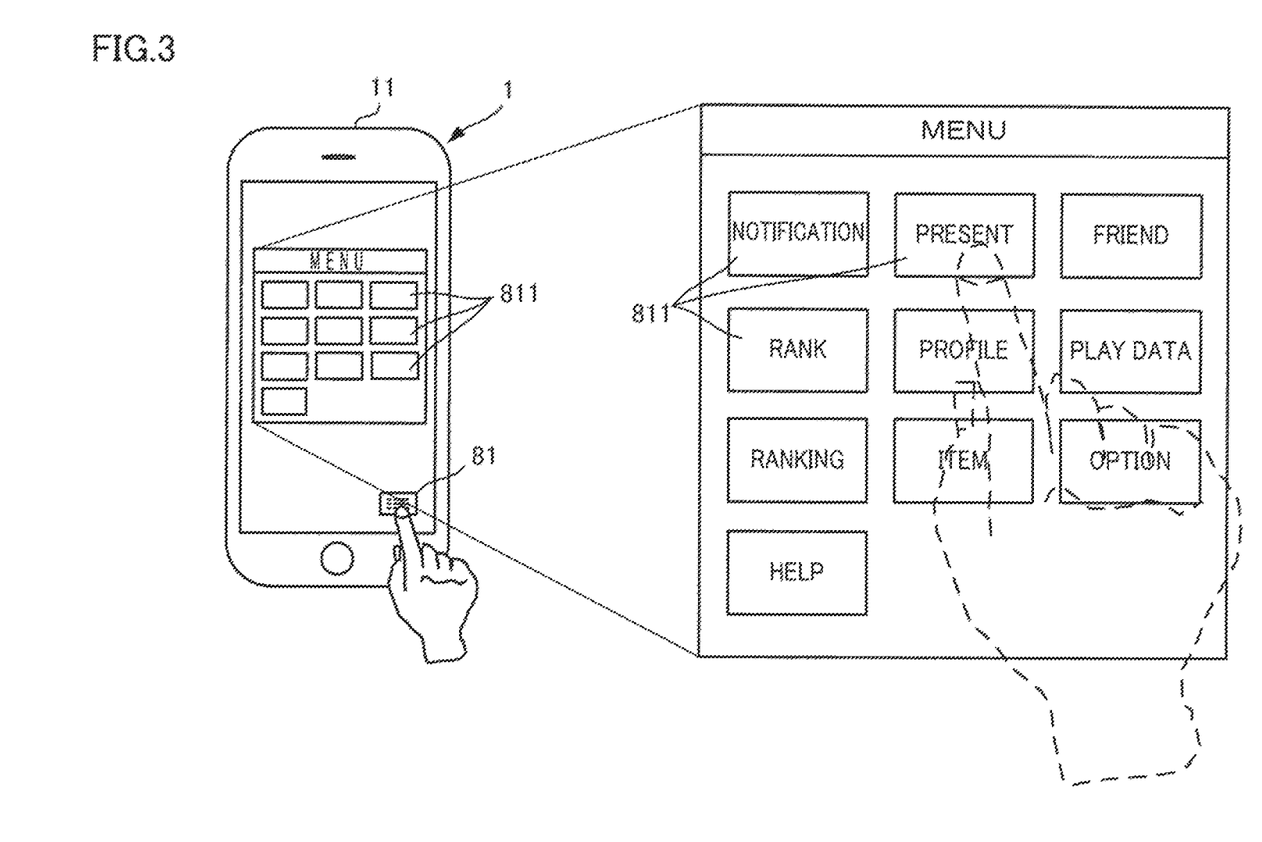
FIG. 3 is an illustrative view showing a display state of the information processor.

As shown in FIG. 3, the information processor 1 having the above-described electrical configuration is capable of displaying various process screens such as a casino screen. On the process screen, a menu button 81 is provided. The menu button 81 is a button for playing a process selection function enabling selection of a main process, and when the player touches it, a menu screen is displayed. The menu screen includes various main process buttons 811 such as "notification", "present", "friend", "rank", "profile", "play data", "ranking", "item", "option", "help", and the like.

For example, when touching the process button 811 of "notification", a screen for notification information from the operator and event information is displayed. When touching the process button 811 of "present", a screen for giving a present is displayed. When touching the process button 811 of "friend", a screen for giving a friend a present or inviting a friend not yet playing a game is displayed. When touching the process button 811 of "item", a screen for using various items during the play of the slot game is displayed.

(Information Processor 1: Present Function)

Figure 4:
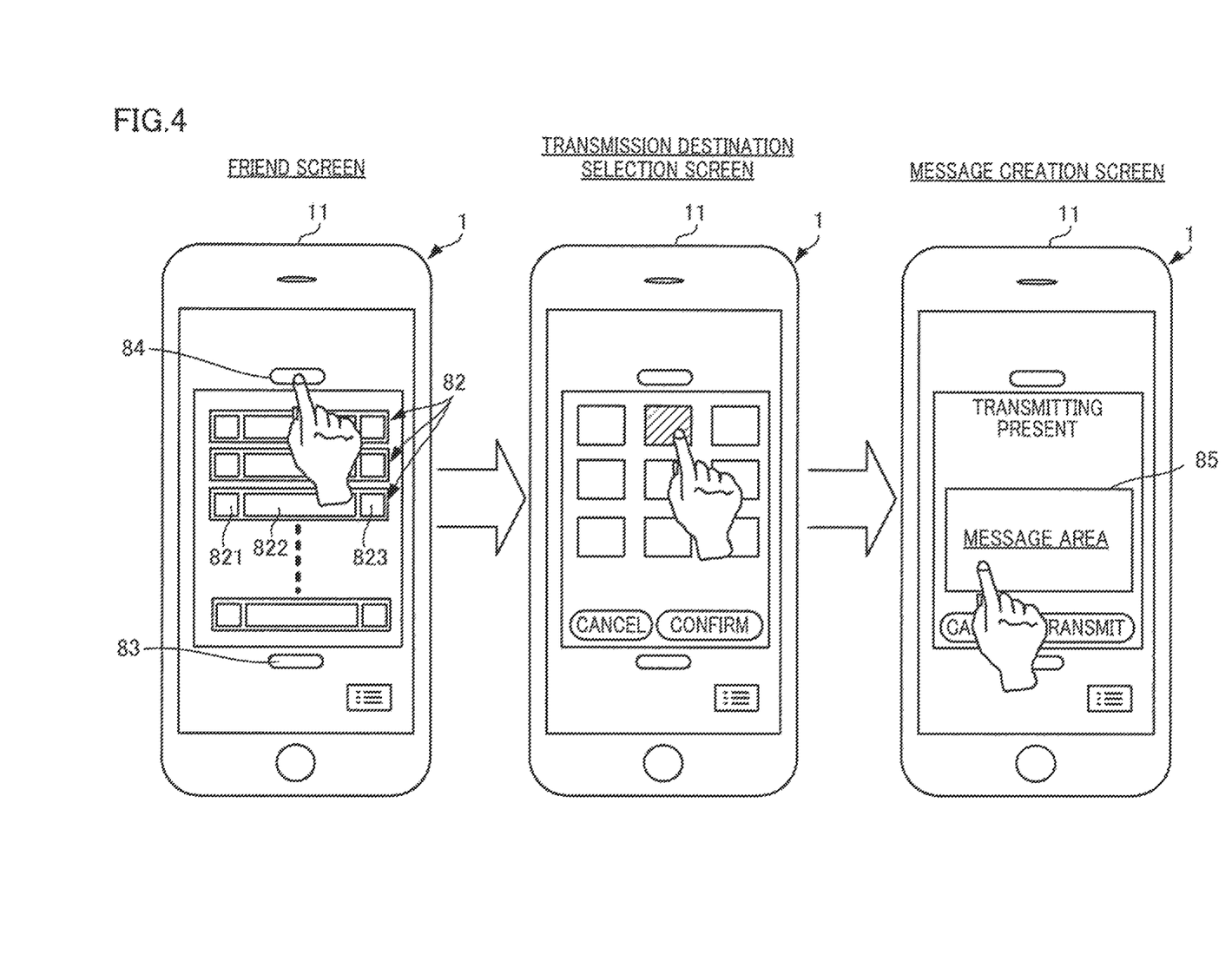
FIG. 4 is an illustrative view showing a display state of the information processor.

As shown in FIG. 4, when the process button 811 of "present" on the menu screen is touched, the present function is played. More specifically, a present screen is displayed. The present screen has a present box 82. The present box 82 reserves presents received from friends or users (players). In addition, the present is stored in the server 7 as a present information of a content corresponding to the status information of the information processor 1 displaying a screen of the present box 82 of the present receiving side. The present information is transmitted from the server 7 and displayed in the present box 82 of the information processor 1 with a predetermined action of touching the "present" button as a trigger.

The present box 82 has an icon display portion 821 for displaying icons of items, a present description portion 822, and a reception button 823. The present description portion 822 is adapted to display the item name, number, message, and receipt time limit. In the message, a single word message of a friend is displayed together with a description of a route from which an item is obtained, such as clearing remuneration of a mission, remuneration of ranking winning, and the like. The reception button 823 is a button for individually receiving the present box 82.

In addition, in the present box 82, a predetermined number such as a maximum of 100 is displayed on one page, and when it exceeds the predetermined number, the present box 82 is switchable to display the next predetermined number of items by the page switching button. In addition, the present box 82 is capable of selecting display conditions such as a full display, a display of only coins, a display of only gems, a display of only items, and the like. Furthermore, the present box 82 can be rearranged in an order from new to old, an order from old to new, and an order from a near deadline to a far deadline.

The present screen has a batch reception button 83 and a present transmission button 84. The batch reception button 83 makes it possible to collectively receive all the present boxes 82. The present transmission button 84 is a button for transmitting a present. When the present transmission button 84 is touched, a transmission destination selection screen is displayed. In the transmission destination selection screen, when transmitting a present, "batch" and "individual" can be selected. In the case of "batch", a plurality of friends are selected and simultaneously transmitting is performed to these friends. In the case of "individual", it is transmitted to one friend. When the "individual" is selected, a message can be added by switching to a message creation screen (a present transmission screen) having a message area 85. In addition, the content of the message is limited to a predetermined number of characters such as 15 characters, and registration is prohibited when a prohibited word is included. When the transmission button is touched, it is transmitted to the server 7 without a message.

(Information Processor 1: Message Function)

Figure 5:
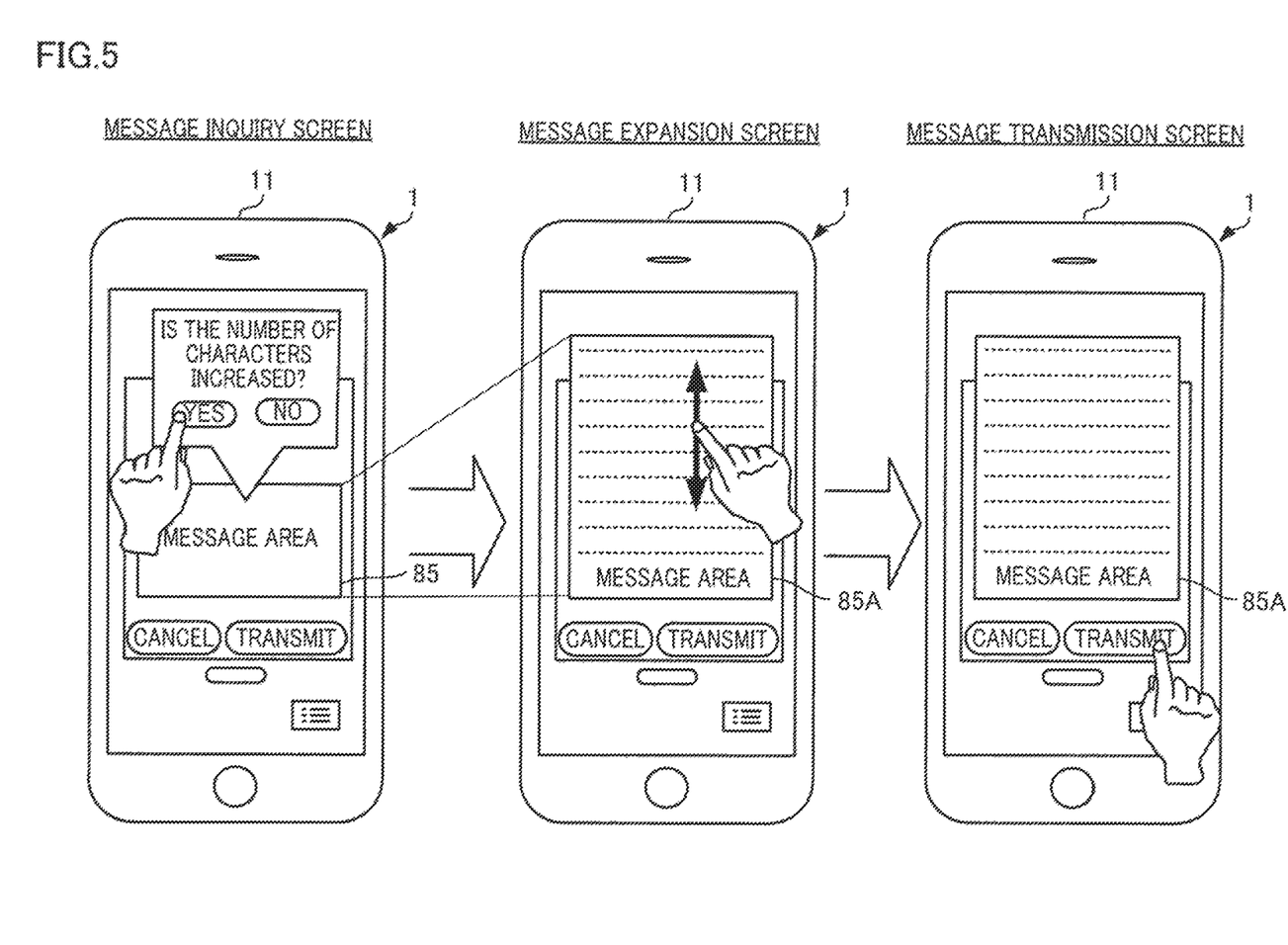
FIG. 5 is an illustrative view showing a display state of the information processor.

As shown in FIG. 5, as the user touches the message area 85, the message creation function is exerted. To be specific, a message inquiry screen including the content of inquiry for message expansion is displayed. For example, a response button (YES, NO) to the question "Do you want to increase the number of characters?" is displayed. When the user desires to increase the number of characters, a message expansion screen having an expanded message area 85A is displayed. In addition, the expanded message area 85A is scrollable up and down by the user dragging the screen. Thereafter, when the user touches the transmission button on the message transmission screen, a transmission confirmation screen is displayed.

Figure 6:
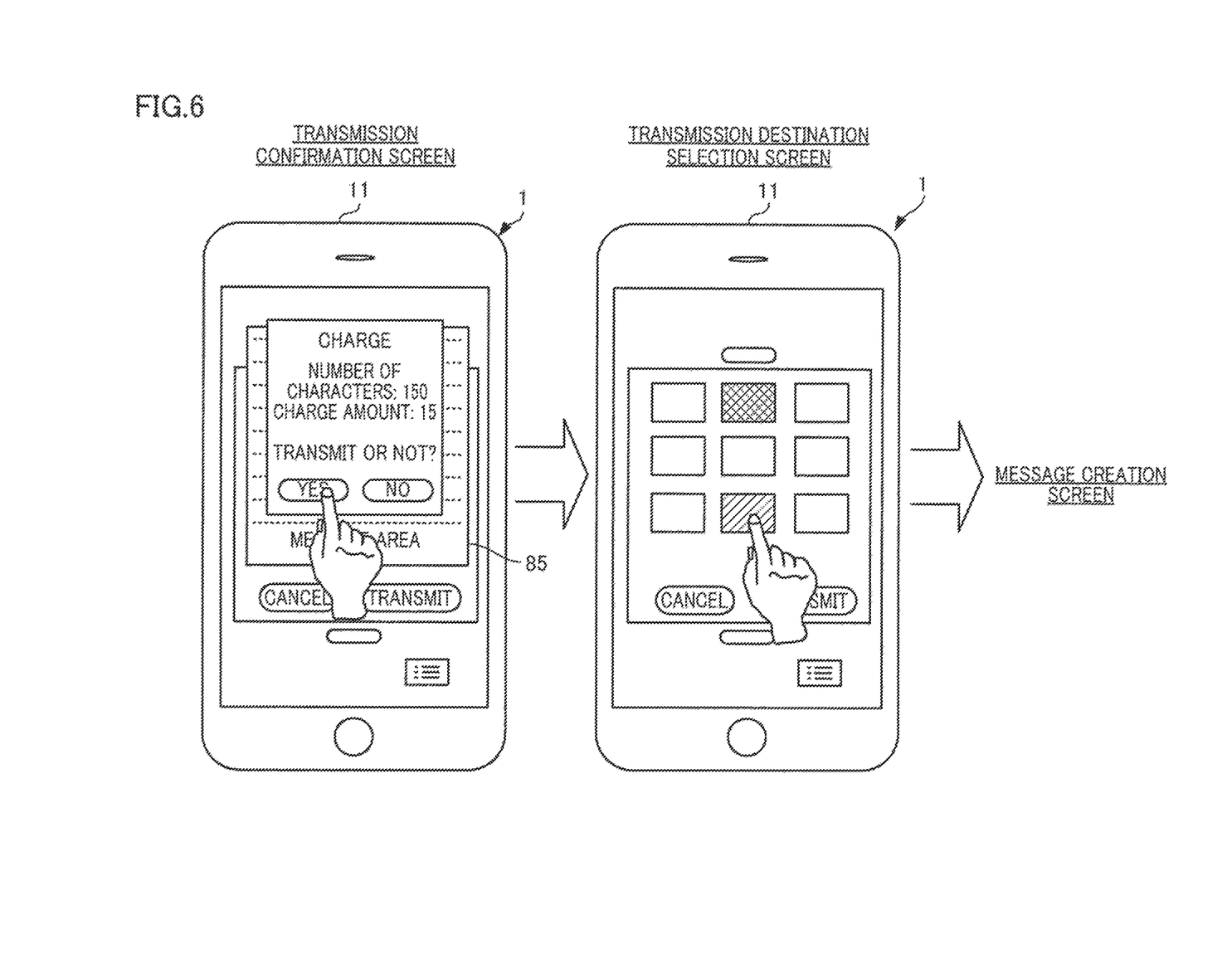
FIG. 6 is an illustrative view showing a display state of the information processor.

As shown in FIG. 6, on the transmission confirmation screen, details of the charge amount corresponding to the expanded content of the message is displayed, and the user is required to confirm and agree on the charge accompanying the expansion of the message. Then, when the user agrees to charge, a transmission destination selection screen is displayed, another transmission destination is selected and added, or a present with a message is transmitted to the selected transmission destination. When another transmission destination is selected and added, the message creation screen is displayed.

Figure 7:
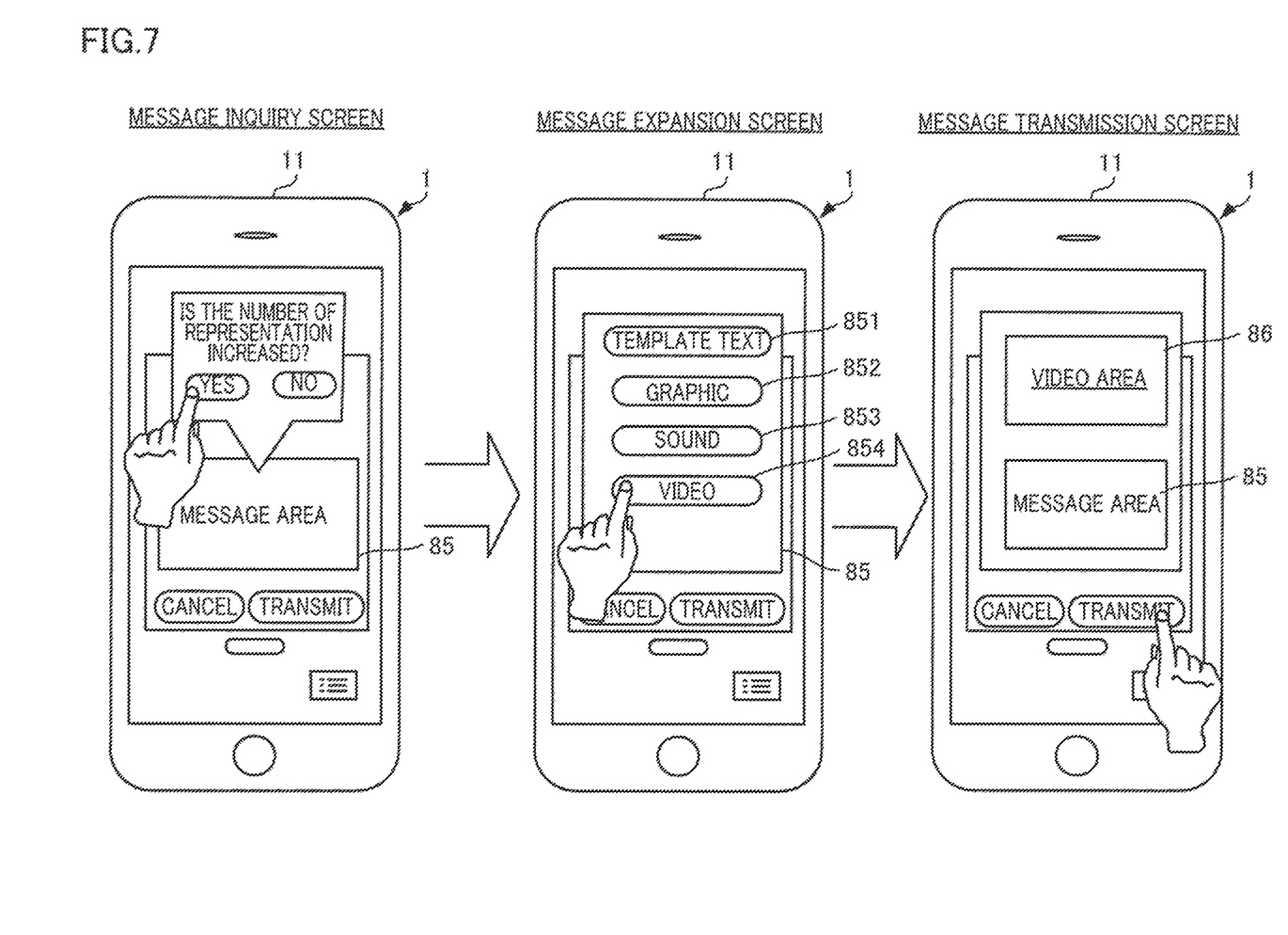
FIG. 7 is an illustrative view showing a display state of the information processor.

As shown in FIG. 7, on the message inquiry screen including the content of inquiry for message expansion, the question of the number of representations "Is the number of representations increased?" is also displayed. The inquiry timing of the number of characters and the number of representations may be the simultaneous timing or different timing. When inquiries for the number of characters and the number of representations are performed at the same time, for example, it is possible to input a voice and a video while creating the message. On the other hand, for example, when inquiring about the expansion of the number of representations after creation of the expanded message concerning the number of characters, after creating the message, it is possible to input while selecting music such as BGM or the like matching the content of the message after the creation of the message.

If the user selects to increase the number of representations, the message expansion screen is displayed. The message expansion screen has a template text button 851, a graphic button 852, an sound button 853, and a video button 854. The template text button 851 is a button for displaying a plurality of types of template text selectably. The graphic button 852 is a button for displaying that a plurality of types of graphics and icons can be selected. The sound button 853 is a button for enabling recording after a predetermined start operation or enabling downloading of music and the like via the Internet or the like. The video button 854 is a button for enabling recording by a camera provided on the information processor 1 after a predetermined start operation or enabling downloading of video via the Internet or the like. Then, when the expansion of the message is completed, the message transmission screen is displayed. For example, when a video is input, the message area 85 and a video area 86 are displayed.

(Information Processor 1: Slot Game)

Figure 8:
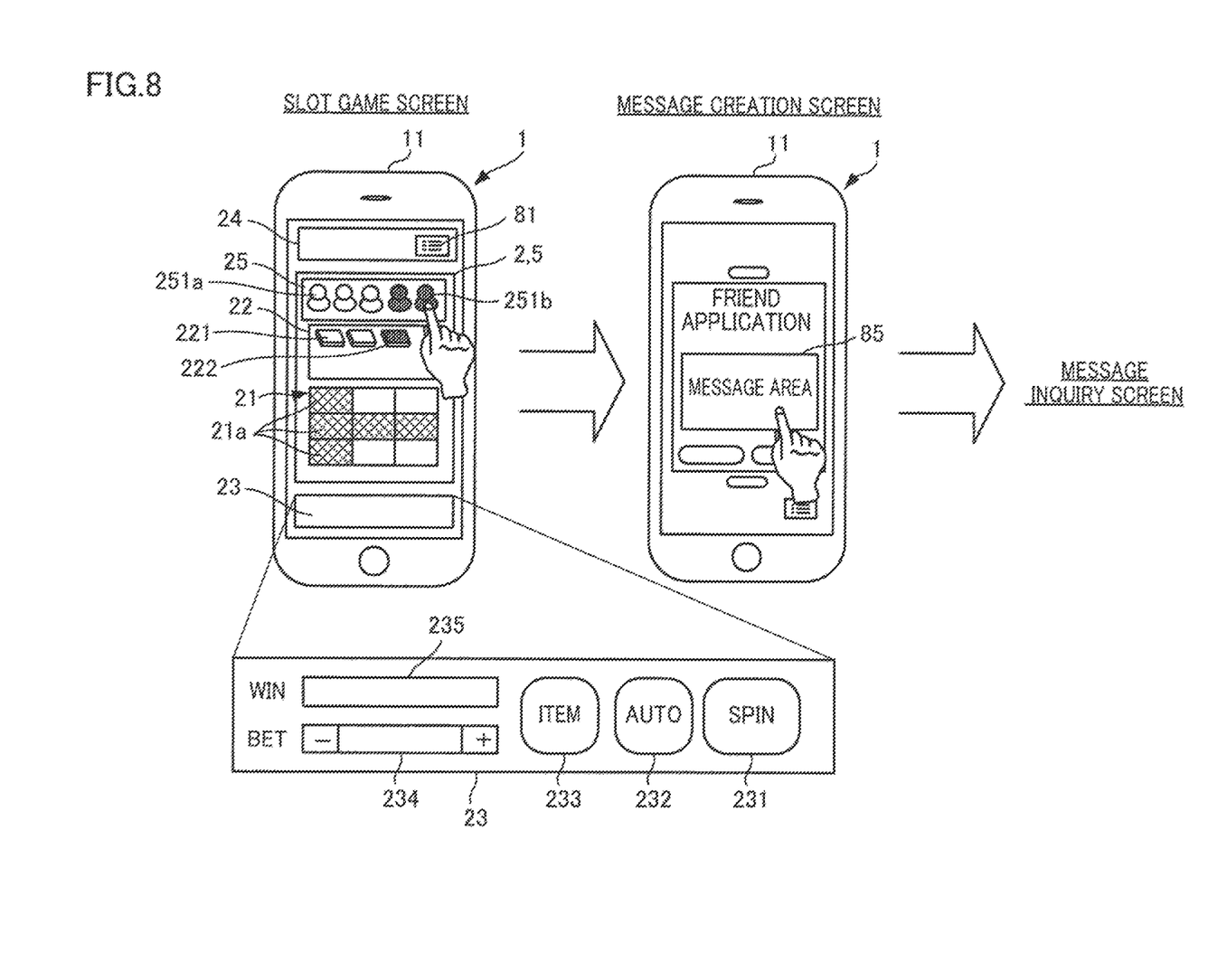
FIG. 8 is an illustrative view showing a display state of the information processor.

As shown in FIG. 8, when the information processor 1 is a gaming machine that runs a slot game, a slot game screen is displayed on the display 2. The slot game screen includes a game area 21a in which a plurality of symbol display areas are displayed in a configuration of a plurality of rows and a plurality of columns, an effect area 22 displaying a video or a still image such as a game character with matching to the slot game, an operation area 23 operated by the player for the progress of the game, and a game information display area 24 for displaying game contents and game information. The operation area 23 includes a spin button 231, an AUTO button 232, an ITEM button 233, a BET button 234, and a WIN display portion 235 as images.

The touch panel 5 that transmits the game screen is provided on the entire surface of the display 2. The touch panel 5 makes it possible to detect the coordinate of the site touched by the player's finger or the like. Thus, for example, by pressing the image of the spin button 231, one slot game (unit game) can be executed. In addition, by pressing the image of the AUTO button 232, the slot game can be continuously performed.

(Information Processor 1: Slot Game: Definition)

The slot game of the present embodiment has a base game and a bonus game. The "base game" is a game in which a plurality of symbols are stopped and displayed (arranged) after variation in the game area 21, and includes a normal game. In addition, a state in which symbols are stopped and displayed after variation in the game area 21 is referred to "rearrangement". The slot game executes a free game as a bonus game with one or more number of game play. The slot game may have a process of executing a free game in which a bonus payout corresponding to the symbols after rearrangement is given under a condition that the payout rate is larger than that of the normal game.

A "gaming value" given when obtaining a bonus according to the game result is a coin, a bill or an electronic valuable information equivalent thereto. The gaming value in the present invention is not particularly limited, and it may be a gaming medium such as a medal, a token, an electronic money, a ticket, and the like. The ticket is not particularly limited, and may be, for example, a bar-coded ticket or the like. Further, the "gaming value" may also be a game point which does not have an valuable information.

The "free game" is a game runnable with a bet of fewer gaming values than the normal game. Note that "bet of fewer gaming values" encompasses a bet of zero (0) gaming value. Therefore, the "free game" may be a game which is executed without setting the bet of gaming value as a condition and pays the amount of gaming value corresponding to the rearranged symbols. In other words, the "free game" may be a game which is started without a precondition of consumption of gaming value. Correspondingly, the "normal game" may be a game which is executed with setting the bet of gaming value as a condition and pays the amount of gaming value corresponding to the rearranged symbols. In other words, the "normal game" may be a game which is started with a precondition of consumption of gaming value.

The "unit game" is a series of actions from the receiving of a bet to a state where a bonus can be established. That is, the unit game is a state in which a bet time for receiving a bet, a game time for rearranging the stopped symbols, and a payout time of the payout process for giving the payout are each included for once.

The "rearrangement" is a state in which symbols are stopped and displayed after variation in the game area 21. In other word, the "rearrangement" means a state in which the symbols are rearranged after the arrangement of the symbols are dismissed. The "arrangement" means a state in which the symbols can be confirmed by a visual contact with respect to the player outside.

(Information Processor 1: Slot Game: Friend Function)

The slot game screen on which the slot game is executed has a friend display area 25. The friend display area 25 displays a friend icon image 251*a* and a non-friend icon image 251*b*. The "friend" means a player who is in a relationship in which a friend application and a friend approval are performed with a player who operates another information processor 1. The "non-friend" means a player who is in a relationship in which a friend application and a friend approval are not performed. When the non-friend icon image 251*b* is touched, the message creation screen for friend application is displayed. When the message area 85 is touched, an inquiry for the expansion of the message is performed.

The friend icon image 251*a* and the non-friend icon image 251*b* are capable of recognizing whether it is a relationship of friend by color distinguishing. The "friend" is used for the friend function. The friend function is a function that can obtain various benefits by having a relationship with a friend. For example, it is a function that an invitation bonus can be obtained by inviting a friend, a present is given to a friend once a day, a bonus is obtained by playing with a friend, or the like.

(Message Process of Information Processing System)

Next, a case will be described where a message is created on the message creation screen when performing the giving of the present in FIG. 4 and the friend application in FIG. 8 from the information processor 1 as the transmission source to the information processor 1 of the transmission destination.

(Message Process of Information Processing System: Terminal-Side Message Process)

Figure 9:
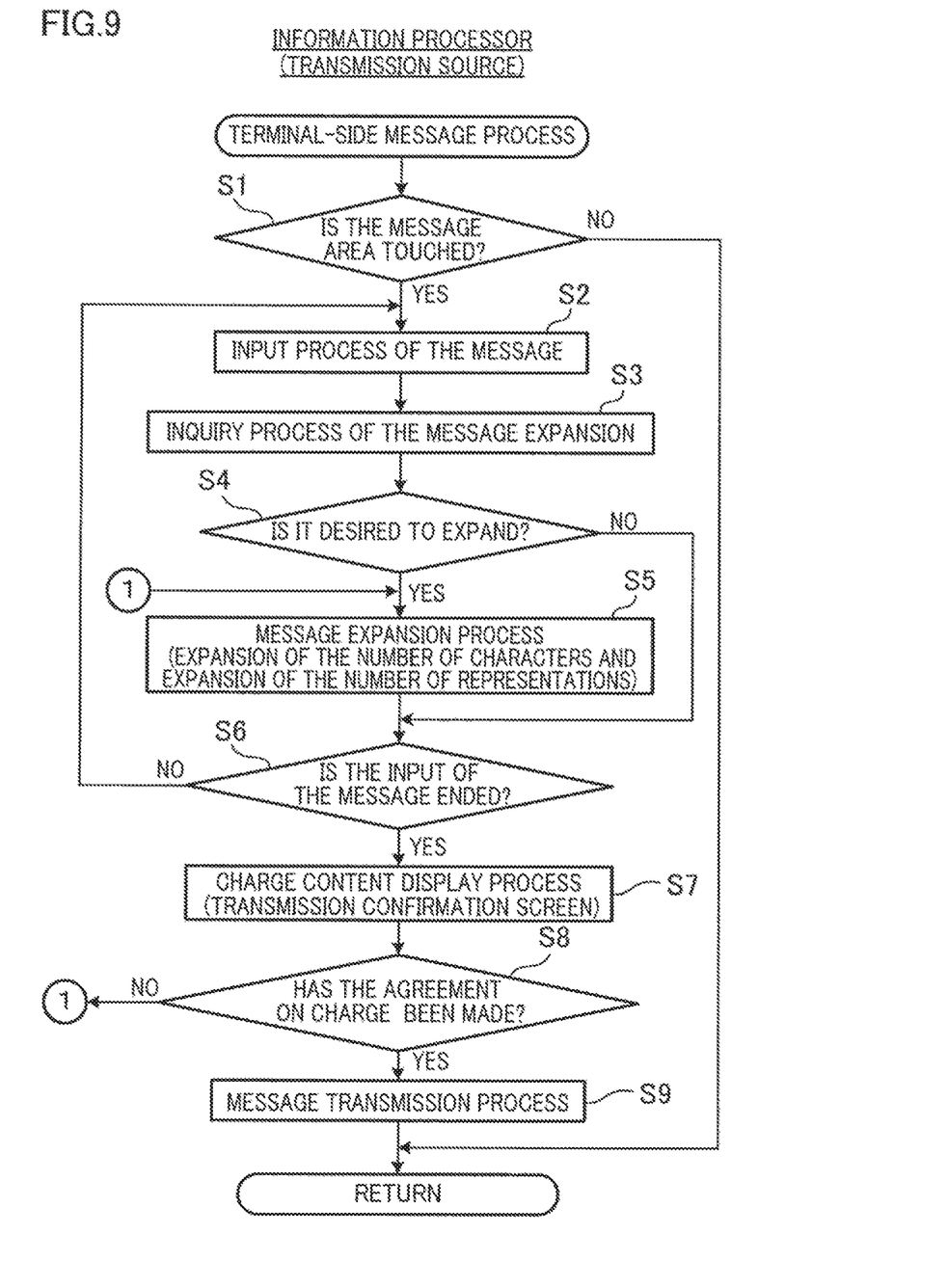
FIG. 9 is a flowchart of a terminal-side message process.

As shown in FIG. 9, in the information processor 1, when the message area 85 of the message creation screen is displayed, the terminal-side message process is executed. First, it is determined whether or not the user has touched the message area 85 (S1). If the user does not touch the message area 85 (S1: NO), the present process is terminated and the terminal-side message process is re-executed after a lapse of a certain time. On the other hand, when the user touches the message area 85 (S1: YES), the input of the message is received (S2). As a result, the user can create a message without charge within a predetermined number of characters such as 15 characters.

At the time of message creation, a message expansion inquiry process is executed (S3). That is, as shown in FIG. 5 and FIG. 7, the message inquiry screen including the content of inquiry for message expansion is displayed. If the user desires to expand (S4: YES), the message expansion process is executed (S5).

Specifically, the message expansion signal is transmitted to the server 7, and the message is expanded from the server 7 with the expansion content corresponding to the status information of the transmission destination and the transmission source. For example, as shown in FIG. 5, when the user desires to perform the expansion of increasing the number of characters, a message expansion screen having an expanded message area 85A is displayed. In addition, as shown in FIG. 7, when an expansion to increase the number of representations is desired, the message expansion screen including the template text button 851 or the like is displayed, and it is possible to create a message with the selected message representation. At the same time, when at least one of the transmission destination and the transmission source has a status higher than the predetermined status, it is possible to create a message under an expansion condition that is advantageous for the user with more number of expanded characters, representation information of more number of samples, a discounted charge or the like, compared to when at least one of the transmission destination and the transmission source has a low status. Thus, this makes it possible to increase the motivation for the user to participate in the game so as to increase the status.

Next, it is determined whether or not the message input has ended (S6). If the input has not ended (S6: NO), the reception process of the input of the message of S2 is continued. On the other hand, when the input of the message is ended (S6: YES), the charge content display process is executed (S7). Specifically, the input message is transmitted to the server 7, and the server 7 receives the charge details and the charge amount corresponding to the message. For example, when the content of the message is a text number of 150 characters, the charge details of 15 gems and the charge information corresponding to 150 characters are received from the server 7. Then, as shown in FIG. 6, for example, the charge amount indicating the charge details with the number of characters of 150 and the charge amount of 15 is displayed, and the user is required to agree on the charge. In addition, when a message is created within the range of no charge, the agreement is not required, and the process shifts to the next step as the agreement has been made. If there is no agreement on charge (S8: NO), the process returns to the message expansion process of S5, and the expanded message is corrected. On the other hand, if there is an agreement on charge (S8: YES), after the message transmission signal is transmitted to the server 7 in the message transmission process (S9), this process is ended.

(Message Process of Information Processing System: Server-Side Message Process)

Figure 10:
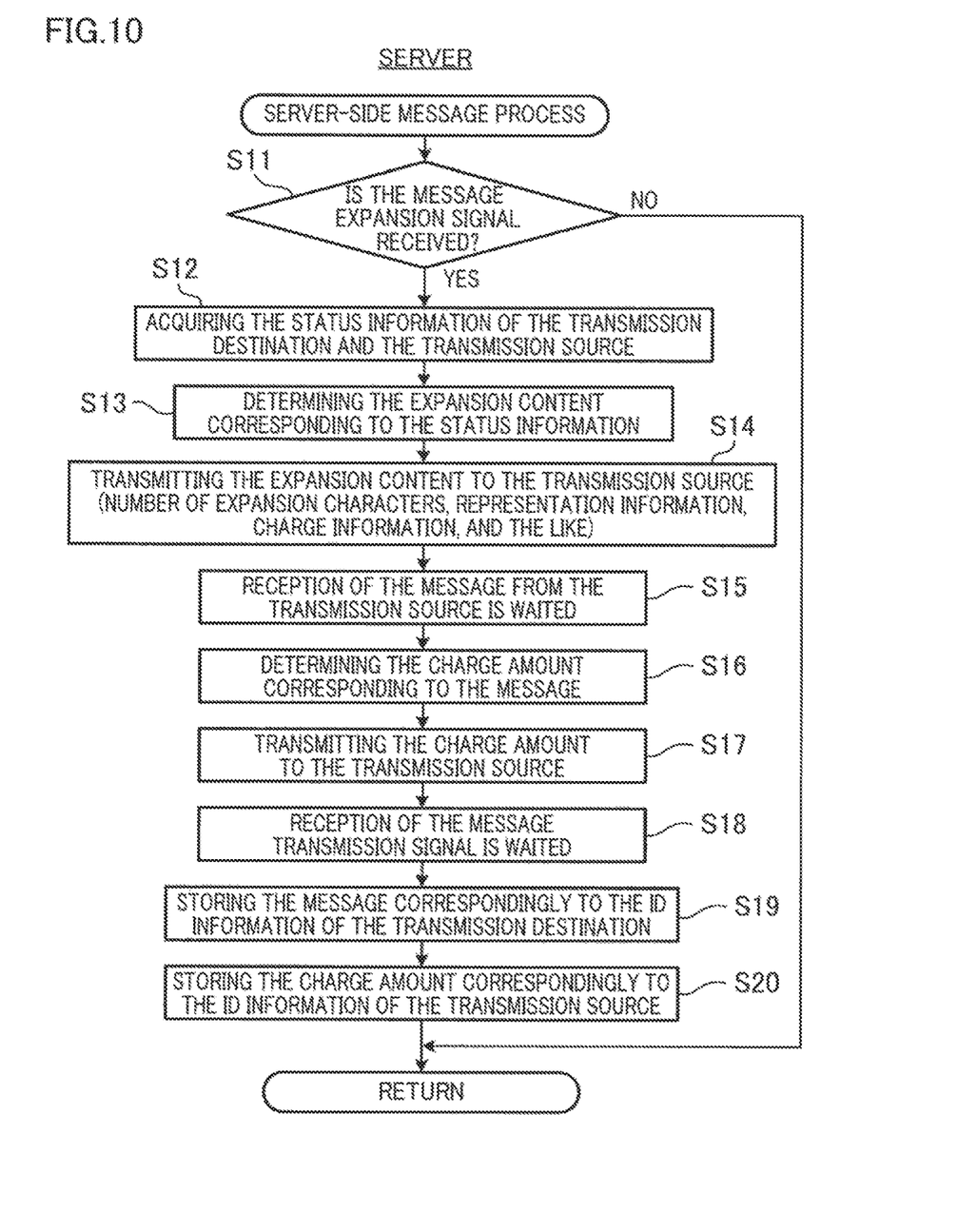
FIG. 10 is a flowchart of a server-side message process.

As shown in FIG. 10, in the server 7, a plurality of processes including the server-side message process are executed in parallel. When the server-side message process is executed, it is determined whether or not a message expansion signal has been received from the information processor 1 as the transmission source (S11). If the message expansion signal is not received (S11: NO), the present process is terminated. On the other hand, if the message expansion signal is received (S11: YES), the status information of the transmission destination and the transmission source is acquired (S12), and the expansion content corresponding to the status information is determined (S13). Then, the expansion content is transmitted to the transmission source (S14), and the reception of the message from the transmission source is waited (S15).

When a message is received from the transmission source, the charge amount corresponding to the message is determined (S16), and the charge amount and the charge details are transmitted to the transmission source (S17). Waits until the message transmission signal is received from the information processor 1 of the transmission source (S18). When the message transmission signal is received, the message is stored correspondingly to the ID information of the transmission destination (S19), and the charge amount is stored correspondingly to the ID information of the transmission destination (S20). Then, the present process is ended.

Although the embodiment of the present invention has been described above, it is merely a specific example, and the present invention is not particularly limited, and the specific configuration of each means and the like can be appropriately designed and changed. In addition, the effects described in the embodiments of the present invention are merely a list of the most preferable effects produced by the present invention, and the effects of the present invention are not limited to those described in the embodiments of the present invention.

What is claimed is:

1. An information processing system, comprising:
   a plurality of information processors configured to execute a game; and
   a server communicably connected to the plurality of information processors, wherein
   a terminal-side controller of each of the information processors is programmed to execute:
   (A1) a process of allowing creation of a message communicable from one of the information processors serving as a transmission source to one of the information processors serving as a transmission destination, and
   (A2) a process of expanding a representable range of the message by increasing the number of characters of the message on condition of charging when the message is created,
   the server comprising:
   a server-side controller that calculates a charge amount to be charged for the message corresponding to the number of characters of the message generated by the one of the information processors serving as the transmission source by referring to a charge amount determination data, the calculated charge amount to be charged communicated to the one of the information processors serving as the transmission source, and
   a server-side memory that stores:
   the message received from the one of the information processors serving as the transmission source in association with ID information of the one of the information processors serving as the transmission destination; and,
   the calculated charge amount;
   wherein, when a receiving operation input is received from the one of the information processors serving as the transmission destination and associated with the ID information, the server authorizes access to the message by the one of the information processors serving as the transmission destination.

2. The information processing system of claim 1, wherein the calculated charge amount to be charged communicated to the one of the information processors serving as the transmission source is charged before the server authorizes access to the message by the one of the information processors serving as the transmission destination.

3. The information processing system of claim 1, wherein the calculated charge amount to be charged communicated to the one of the information processors serving as the transmission source is not charged until authorization therefor is received from the one of the information processors serving as the transmission source.

4. An information processing system, comprising:
   a plurality of information processors configured to execute a game; and
   a server communicably connected to the plurality of information processors, wherein
   a terminal-side controller of each of the information processors is programmed to execute:
   (A1) a process of allowing creation of a message communicable from one of the information processors serving as a transmission source to one of the information processors serving as a transmission destination, and
   (A2) a process of expanding a representable range of the message on condition of charging when the message is created, the server comprising:
  a server-side controller that calculates a charge amount to be charged for the message generated by the one of the information processors serving as the transmission source by referring to a charge amount determination data, the calculated charge amount to be charged communicated to the one of the information processors serving as the transmission source: and
  a server-side memory that stores:
    the message received from the one of the information processors serving as the transmission source in association with ID information of the one of the information processors serving as the transmission destination; and,
    the calculated charge amount;
wherein, when a receiving operation input is received from the one of the information processors serving as the transmission destination and associated with the ID information, the server authorizes access to the message by the one of the information processors serving as the transmission destination;
wherein, the terminal-side controller of each of the information processors,
  in the process (A2), expands the representable range of the message by increasing the number of representations of the message; and,
wherein, the server-side controller of the server,
  calculates the charge amount corresponding to the number of representations of the message by referring to the charge amount determination data.

5. An information processing system, comprising:
a plurality of information processors configured to execute a game; and
a server communicably connected to the plurality of information processors, the server configured to obtain and store information corresponding to execution of the game at each of the plurality of information processors, wherein
a terminal-side controller of each of the information processors is programmed to execute:
  (A1) a process of allowing a creation of a message communicable from one of the information processors serving as a transmission source to one of the information processors serving as a transmission destination, and
  (A2) a process of expanding a representable range of the message on condition of charging when the message is created,
the server comprising:
  a server-side controller that calculates a charge amount to be charged for the message generated by the one of the information processors serving as the transmission source by referring to a charge amount determination data, the calculated charge amount to be charged communicated to the one of the information processors serving as the transmission source and
  a server-side memory that stores:
    the message received from the one of the information processors serving as the transmission source in association with ID information of the one of the information processors serving as the transmission destination; and,
    the calculated charge amount;
wherein, when a receiving operation input is received from the one of the information processors serving as the transmission destination and associated with the ID information, the server authorizes access to the message by the one of the information processors serving as the transmission destination.

6. The information processing system of claim 5, wherein:
the server-side memory of the server,
  stores status information indicating a status that increases correspondingly to a degree of progress in the game with respect to each of the plurality of information processors,
the terminal-side controller of each of the information processors,
  in the process (A1), when allowing the creation of the message, acquires the status information of the one of the information processors serving as the transmission source of the message and the status information of the one of the information processors serving as the transmission destination of the message from the server, and sets the representable range of the message on the basis of the acquired status information,
  in the process (A2), when the message is created, expands the representable range of the message on condition of charging.

7. The information processing system of claim 5, wherein:
the server-side memory of the server,
  a stores present information indicating content of a present given among the plurality of information processors,
the terminal-side controller of each of the information processors,
  in the process (A1), when allowing the creation of the message, acquires the present information from the server, and sets the representable range of the message on the basis of the present information,
  in the process (A2), when the message is created, expands the representable range of the message on condition of charging.

8. An information processing system, comprising:
a plurality of information processors configured to execute a game; and
a server communicably connected to the plurality of information processors, the server storing a message from one of the information processors in association with ID information of a sender, and allowing the message to be viewed when a receiving input is made from one of the information processors associated with the ID information of a sender of the receiving input, wherein
a terminal-side controller of each of the information processors is programmed to execute:
  (A1) a process of allowing creation of a message from one of the information processors serving as a transmission source to one of the information processors serving as a transmission destination, and
  (A2) a process of expanding a representable range of the message on condition of charging when the message is created,
the server comprising:
  a server-side controller that calculates a charge amount to be charged for the message generated by the one of the information processors serving as the transmission source by referring to a charge amount determination data and notifies the one of the information processors serving as the transmission source and creating the message of the charge amount, and a server-side memory that stores:
the message received from the one of the information processors serving as the transmission source in association with ID information of the one of the information processors serving as the transmission destination; and, the calculated charge amount;

wherein, when a receiving operation input is received from the one of the information processors serving as the transmission destination and associated with the ID information, the server authorizes access to the message by the one of the information processors serving as the transmission destination.

9. The information processing system of claim 8, wherein:
the terminal-side controller of each of the information processors,
in the process (A2), expands the representable range of the message by increasing the number of characters of the message,
the server-side controller of the server,
calculates the charge amount corresponding to the number of characters of the message by referring to the charge amount determination data.

10. The information processing system of claim 8, wherein:
the terminal-side controller of each of the information processors,
in the process (A2), expands the representable range of the message by increasing the number of representations of the message,
the server-side controller of the server,
calculates the charge amount corresponding to the number of representations of the message by referring to the charge amount determination data.

11. The information processing system of claim 8, wherein:
the server-side memory of the server,
stores status information indicating a status that increases correspondingly to a degree of progress in the game with respect to each of the plurality of information processors,
the terminal-side controller of each of the information processors,
in the process (A1), when allowing the creation of the message, acquires the status information of the one of the information processors serving as the transmission source of the message and the status information of the one of the information processors serving as the transmission destination of the message from the server, and sets the representable range of the message on the basis of the status information,
in the process (A2), when the message is created, expands the representable range of the message on condition of charging.

12. The information processing system of claim 8, wherein:
the server-side memory of the server,
stores present information indicating content of a present given among the plurality of information processors,
the terminal-side controller of each of the information processors,
in the process (A1), when allowing the creation of the message, acquires the present information from the server, and sets the representable range of the message on the basis of the present information,
in the process (A2), when the message is created, expands the representable range of the message on condition of charging.

* * * * *